(12) United States Patent
Ekkert

(10) Patent No.: US 11,612,902 B2
(45) Date of Patent: Mar. 28, 2023

(54) NOZZLE TIPS WITH REDUCED CLEANING TIME

(71) Applicant: Phoenix Closures, Inc., Naperville, IL (US)

(72) Inventor: Len Ekkert, Lemont, IL (US)

(73) Assignee: Phoenix Closures, Inc., Naperville, IL (US)

( * ) Notice: Subject to any disclaimer, the term of this patent is extended or adjusted under 35 U.S.C. 154(b) by 59 days.

(21) Appl. No.: 16/032,578

(22) Filed: Jul. 11, 2018

(65) Prior Publication Data
US 2020/0016614 A1    Jan. 16, 2020

(51) Int. Cl.
| | |
|---|---|
| *B05B 1/34* | (2006.01) |
| *B05B 1/16* | (2006.01) |
| *B05B 1/06* | (2006.01) |
| *B29C 45/27* | (2006.01) |

(52) U.S. Cl.
CPC .............. *B05B 1/3442* (2013.01); *B05B 1/06* (2013.01); *B05B 1/169* (2013.01); *B05B 1/3489* (2013.01); *B29C 45/278* (2013.01); *B29C 2045/2759* (2013.01); *B29C 2045/2775* (2013.01); *B29C 2045/2777* (2013.01)

(58) Field of Classification Search
CPC ......... B29C 67/00; B29C 48/00; B29C 48/16; B29C 45/00; B29C 45/278; B29C 2045/2783; B29C 45/20; B29C 45/22; B33Y 10/00; B05B 1/34; B05B 1/06; B05B 1/16; B05B 1/3442; B05B 1/169; B05B 1/3489; F02M 63/00; F02M 61/18; F02M 61/16

See application file for complete search history.

(56) References Cited

U.S. PATENT DOCUMENTS

| | | | |
|---|---|---|---|
| 2,500,401 A | 3/1950 | Cossette | |
| 3,253,302 A * | 5/1966 | Peters | .................. B29C 45/581 |
| | | | 210/184 |
| 3,295,169 A | 3/1967 | Moslo | |
| 3,902,665 A | 9/1975 | Hendry | |

(Continued)

OTHER PUBLICATIONS

Final Office Action for U.S. Appl. No. 16/033,047 dated Oct. 14, 2020.

(Continued)

*Primary Examiner* — Galen H Hauth
*Assistant Examiner* — Shibin Liang
(74) *Attorney, Agent, or Firm* — Husch Blackwell LLP

(57) ABSTRACT

The invention relates to nozzle tips including a nozzle body and a tip portion, configured to minimize the accumulation of a resin on the nozzle tip as it is dispensed through the nozzle tip. The nozzle tip can contain a central flow channel and an internal portion that branches and guides the resin into multiple exiting flow channels that define tangential pathways to the outer surface of the nozzle tip. The nozzle tip can include grooves that define extended, sharply angled flow paths for the resin.

Nozzle tips can have a neck portion separating a nozzle body and a tip end of the nozzle tip; here, a doughnut-shaped space located around the neck portion can be defined by the base of the nozzle, the crown of the nozzle, and the neck portion, for encouraging turbulent flow of the resin to scour the nozzle tip during dispensing.

7 Claims, 7 Drawing Sheets

(56) References Cited

U.S. PATENT DOCUMENTS

| | | | |
|---|---|---|---|
| 3,954,209 A | | 5/1976 | Ramond |
| 4,427,361 A | | 1/1984 | Saito |
| 4,678,427 A | | 7/1987 | Fritzsche |
| 4,781,554 A | | 11/1988 | Hendry |
| 5,059,113 A | | 10/1991 | Ito et al. |
| 5,206,040 A | * | 4/1993 | Gellert ............... B29C 45/27 |
| | | | 264/297.2 |
| 5,513,976 A | | 5/1996 | McGrevy |
| 6,789,745 B1 | | 9/2004 | Babin et al. |
| 7,238,019 B2 | | 7/2007 | Schwenk |
| 7,344,372 B2 | | 3/2008 | Fairy |
| 9,833,799 B2 | | 12/2017 | Minnette et al. |
| 2003/0082266 A1 | * | 5/2003 | Babin ............... B29C 45/278 |
| | | | 425/562 |
| 2011/0117238 A1 | | 5/2011 | Gunther et al. |
| 2016/0046073 A1 | * | 2/2016 | Hadas ............... B29C 67/0085 |
| | | | 264/211.21 |
| 2019/0293039 A1 | * | 9/2019 | Shaull ............... F02M 63/0078 |

OTHER PUBLICATIONS

Amendment for or U.S. Appl. No. 16/033,047 dated Dec. 3, 2020.
Final Office Action from related patent application U.S. Appl. No. 16/033,047, dated Mar. 22, 2021.
Amendment filed as response to Mar. 22, 2021 Final Office Action from related patent application U.S. Appl. No. 16/033,047, dated Jun. 9, 2021.

* cited by examiner

NOZZLE TIPS WITH REDUCED CLEANING TIME

BACKGROUND OF THE INVENTION

This invention relates generally to a nozzle having a nozzle tip that provides improved delivery of a liquid or flowable material, such as resin, through the nozzle and relates particularly to an improved nozzle tip for injection molding.

Nozzles are typically used to dispense resins or other flowable materials for injection molding. Nozzles are also used in other fields to dispense other liquids or flowable materials, such as inks, paints, and food products. Such nozzles can be used to dispense more than one kind of flowable material. However, when a user changes from dispensing one resin to another, all of the old resin must be cleared from the nozzle and particularly from the nozzle tip. If not, then leftover old resin can bleed into the stream of new resin and render the new resin unusable until the old resin is completely cleared from the nozzle tip. However, extensive time and effort can be required to thoroughly clear residual old resin from a nozzle tip.

Nozzle tips can contain "dead spots" along the path through which the flowable material or resin travels, locations where portions of the flowable material can accumulate and build up.

Dead spots are likely to occur at locations in the flow path where resin encounters a pocket-like or concave structure. A portion of the resin can collect in such structures and get left behind while the remaining resin flows past the pocket of resin. Dead spots can occur at locations in the flow path where nozzle tip structures meet and form a two-dimensional crease or fold (where two planes meet) or a three-dimensional corner (where more than two planes meet). Resins can get caught in the pockets, corners, and creases created by these structures and remain there until later washed or flushed out.

In a conventional nozzle tip, resin can accumulate where it encounters a dead spot, such as concave structures, in its flow path, pooling in a cavity or depression or collecting in pocket-like configurations in the nozzle tip. Such pockets can be found where a resin delivery channel divides or separates into multiple flow streams.

These pockets of resin can impede the even flow of resin through and from the nozzle. These resin pockets can create a particular problem when the delivery of a first resin is completed and a second, different resin is delivered through the same nozzle. If the accumulated first resin is not removed, then it can bleed into the newly-loaded second resin, resulting in the initial delivery of a mixture of resins, rather than the delivery of the new resin alone. Such mixed resins can have undesirable color or consistency; other physical characteristics can also be affected, such as viscosity, tensile strength, or melting temperature. Mixed resins can perform in unpredictable or inconsistent manners, which can be especially problematic where the presence of mixed materials is not readily detectable.

Such resin mixtures can be prevented by removing all traces of the first resin before loading the second resin, but this process can be costly and time-consuming, and can require additional efforts to remove the cleaning agent used to remove the leftover resin. Thorough cleaning can also require disassembly of the nozzle, during which time the nozzle is unavailable for use, and creates the risk of other contaminants being introduced into the nozzle tip. There is also the possibility that such cleaning efforts can be unsuccessful in removing all of the built-up resin.

An alternative solution to remove accumulations of the first resin is to dispense a stream of the second resin until all of the first resin is flushed away. This, too, can be time-consuming, expensive, and can be wasteful of resin materials. Also, it can be difficult to tell when the flushing is complete; too little flushing and mixed resins are initially dispensed, too much flushing and resin materials are wasted.

There is a particular need for a nozzle tip with fewer or smaller dead spots, decreasing the amount of resin that builds up in and on the nozzle tip, thus reducing the amount of cleaning needed between uses or, ideally, eliminating the need for cleaning the nozzle tip between the uses of different resins. It is therefore desirable to provide a simple and effective nozzle tip design that reduces or eliminates structures in which resins can accumulate and/or encourages continuous flow through and from the nozzle tip. Nozzle tips, and nozzles incorporating these nozzle tips, according to the present invention achieve this result with features that minimize the buildup of flowable materials along their flow paths through the nozzle tips.

BRIEF SUMMARY OF THE INVENTION

This invention generally relates to an improved nozzle tip configured with features that decrease or eliminate the buildup of flowable materials at dead spots in and around the flow path defined by the nozzle tip. By minimizing this undesired buildup of resin, less cleaning or flushing is required to later remove it from the nozzle tip, and can have the added benefit of saving resin materials, labor, and time.

Some embodiments of the invention relate to a nozzle tip for dispensing flowable materials comprising: a) a nozzle body in communication with a tip portion, the nozzle body defining a central flow channel therewithin, the central flow channel in communication with a plurality of exiting flow channels, each exiting flow channel having an inlet and a port, each inlet communicating with the central flow channel of the nozzle body and each port communicating with an outer surface of the tip portion; and b) the tip portion comprising a tip end, and a branching portion opposite the tip end; where each exiting flow channel extends in a tangential pathway from the central flow channel to the outer surface of the tip portion.

Aspects of these embodiments can include the branching portion having a base segment communicating with a terminal end of the central flow channel, and a tapering segment extending into the central flow channel and away from the tip end.

Aspects of these embodiments can include the exiting flow channels do not intersect each other.

Aspects of these embodiments can include the inlets being spaced apart on a periphery of the terminal end of the central flow channel, and the ports being located on the tip end and are spaced apart from each other.

Aspects of these embodiments can include the inlets being positioned around the central flow channel at regularly-spaced intervals on a plane perpendicular to a longitudinal axis of the central flow channel, and the ports being located on the outer surface of the tip portion at regularly-spaced intervals on a plane perpendicular to the longitudinal axis of the central flow channel.

Aspects of these embodiments can include each exiting flow channel defining a straight path between the inlet and the port.

Aspects of these embodiments can include each exiting flow channel having a first side that is shorter than a second side, and each exiting flow channel having radially symmetrical positions around the longitudinal axis of the central flow channel.

Aspects of these embodiments can include the branching portion comprising a shape chosen from the following: pyramidal; frustoconical; trapezoidal; and conical.

Aspects of these embodiments can include an apparatus comprising the nozzle tip.

Some embodiments of the invention relate to a nozzle tip for dispensing flowable materials including a) a nozzle body in communication with a tip portion, the nozzle body including an interior central flow channel, the central flow channel in communication with a plurality of spaced-apart exiting flow channels, each exiting flow channel having an inlet and a port, each inlet communicating with the central flow channel in the nozzle body and each port communicating with an outer surface of the tip portion; b) the tip portion comprising a tip end connected to a branching portion, the tip end tapering away from the branching portion, and c) the branching portion extending into the central flow channel and away from the tip end; where each exiting flow channel defines a path between the central flow channel and the outer surface of the tip portion, each path defining a non-intersecting secant extending outward from a periphery of the central flow channel.

Aspects of these embodiments can include the inlets being spaced apart around a terminal end of the central flow channel, and the ports being spaced apart on the outer surface of the tip portion, the ports being located at equal distances from the nozzle body.

Aspects of these embodiments can include each port contacting the nozzle body.

Aspects of these embodiments can include each exiting flow channel defining an arcing path between the central flow channel and the outer surface of the tip portion.

Aspects of these embodiments can include a terminal end of the central flow channel decreasing in circumference to communicate with a base of the branching portion, the central flow channel having an arcing surface at the terminal end.

Aspects of these embodiments can include each port being located closer to the nozzle body than to an apex of the tip end.

Aspects of these embodiments can include the inlets of the exiting flow channels being uniformly spaced apart around the branching portion, the ports of the exiting flow channels being uniformly spaced apart on the outer surface of the tip end, and a line defined by each exiting flow channel not intersecting the branching portion.

Aspects of these embodiments can include the exiting flow channels extending away from a longitudinal axis of the central flow channel, and the exiting flow channels extending away from the nozzle body.

Some embodiments of the invention relate to a nozzle tip for dispensing a flowable material including: a) a nozzle body comprising a central flow channel inside the nozzle body; b) a tip portion communicating with a base portion of the nozzle body, the tip portion including i) a base connected to the nozzle body; ii) an external tip end joined to and extending away from the tip base; and iii) a plurality of grooves on an outer surface of the tip portion, each groove extending in a first direction; c) the central flow channel communicating with the tip base; and d) a plurality of exiting flow channels connecting the central flow channel to the outer surface of the tip portion, each exiting flow channel having a first opening located at a juncture of the tip base and the central flow channel, each exiting flow channel having a second opening located at the outer surface of the tip portion, and each exiting flow channel positioned perpendicular to the a longitudinal axis of the central flow channel; where the plurality of grooves joins the plurality of exiting flow channels, each groove having a first end joining the second opening of the exiting flow channel, each joined exiting flow channel and groove defining a nonlinear pathway for extruding the flowable material from the nozzle tip.

Aspects of these embodiments can include each groove positioned perpendicular to a longitudinal axis of the central flow channel.

Aspects of these embodiments can include each groove positioned perpendicular to the exiting flow channel.

Aspects of these embodiments can include the tip base connecting to a branching portion extending into the central flow channel.

Aspects of these embodiments can include the branching portion comprising a shape chosen from the following: pyramidal; frustoconical; trapezoidal; and conical.

A more detailed explanation of the invention is provided in the following description and claims and is illustrated in the accompanying drawings.

BRIEF DESCRIPTION OF THE FIGURES

The accompanying drawings illustrate the present invention and together with the description, further serve to explain the principles of the invention and to enable a person skilled in the relevant art to make and use the invention.

These and other features and advantages of the present invention will be apparent from the following detailed description, claims, and accompanying drawings.

DETAILED DESCRIPTION OF THE INVENTION

Figure 1:
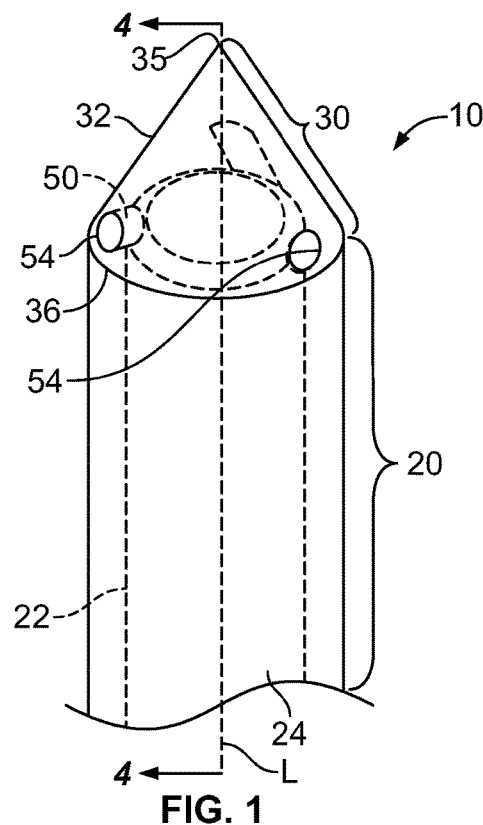
FIG. 1 shows an exterior view of an embodiment of a nozzle tip.

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiment.

The features of the invention disclosed herein in the description, drawings, and claims can be significant, both individually and in any desired combinations, for the operation of the invention in its various embodiments. Features from one embodiment can be used in other embodiments of the invention.

It should be further understood that the title of this section of this specification, namely, "Detailed Description Of The Invention," relates to a requirement of the United States Patent & Trademark Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring to FIGS. 1-10, embodiments of a nozzle tip and nozzle are shown in accordance with the present invention. The invention relates to an improved nozzle tip configured to minimize or prevent the entrapment and/or accumulation of flowable material at locations in or on the flow path defined by the nozzle tip.

OVERVIEW OF EMBODIMENTS OF THE INVENTION

Generally, the nozzle tip 10 is made of a nozzle body 20 with a tip portion 30. Some embodiments can include a neck portion that separates the nozzle body 20 and the tip portion 30, while other embodiments can include the nozzle body 20 directly joined to the tip portion 30 (FIGS. 1-10). The nozzle body 20 defines a passageway or cavity in its interior for transporting the resin or flowable material to extrude the resin at multiple sites on the nozzle tip 10, at multiple sites in the nozzle body 20 or the tip portion 30. The nozzle body 20 can dispense resin through a main or central flow channel 24 that travels through the interior of the nozzle body 20 and branches out into one or more delivery channels 50. Each delivery channel 50 can have an opening or inlet 52 on one end that communicates with the central flow channel 24 and one or more openings or outlets or ports 54 on the opposite end for communicating with the outer surface 32, 21 of the tip portion 30 or the nozzle body 20, respectively. After a flowable material is dispensed outside of the nozzle body 20, the material can flow onto the outer surface 21 of the nozzle tip 10, which delivers the material to its destination.

The nozzle tip 10 can include a nozzle body 20 having a base portion 26 and a tip portion 30, each having an outer surface 21, 32, respectively. The base and tip portions 26, 30 can be joined together directly, as described in Embodiments 1 and 2, or have a neck portion.

On the end opposite (or furthest from) the tip portion 30, the nozzle body 20 can terminate in a nozzle base portion 26, the base portion 26 for communicating with an apparatus containing a resin or other flowable device (not shown). The end of the nozzle body 20 that is closest the tip portion 30 can be directly or indirectly connected to the tip portion 30.

At the end closest to the nozzle body 20, the tip portion 30 can have a tip base 36. The tip base 36 can connect to the nozzle body 20 and can adjoin or abut the terminal end 25 of the central flow channel 24. Most or all of the tip base 36 can be in the interior of the nozzle tip 10. The tip portion 30 can include a tip end 34 connected to the tip base 36, the tip end 34 can narrow or taper into a convex shape. For example, the tip end 34 can taper into an apex 35 with a point or other structure generally associated with the end of a nozzle tip (i.e., conical, pyramidal, trapezoidal, frustoconical).

The tip portion can include a branching portion 40, the branching portion 40 for dividing the central flow channel 24 into multiple exiting flow channel channels. The branching portion 40, which can be located in the interior of the nozzle tip 10, can be contoured to divert the flow of resin from the central flow channel 24 into the exiting flow channels 50. The branching portion 40 can include the part of tip portion 30 located closest to the nozzle base portion 26. The branching portion 40 can extend into the central flow channel 24 and can have a convex shape. For example, the branching portion 40 can narrow or taper or protrude into a branch point 46, which can include an apex 47 with a sharp or blunt point.

In some embodiments, the tip end 34 and branching portion 40 can extend or taper in opposite directions, with the tip end 34 tapering on the exterior of the nozzle tip 10, and the branching portion 40 tapering into the interior of the nozzle tip 10.

When an apparatus employs the nozzle tip 10 to dispense a flowable material such as a resin, the resin can move from a resin-containing apparatus and through the nozzle tip 10 via a central flow channel 24 disposed in the interior of the nozzle body 20 along a central longitudinal axis of the nozzle body 20, the central flow channel 24 communicating with one or more exiting flow channels 50. Each exiting flow channel 50 can have two ends that define a hole or an opening; one end has an inlet 52 for diverting the resin from the central flow channel 24 into the exiting flow channel 50 and the other terminal end 25 has a port 54 through which the resin exits the nozzle tip 10. Each exiting flow channel 50 can have the same diameter or circumference throughout its length. Each exiting flow channel 50 can vary in its diameter or circumference along its length.

In some embodiments, the ports 54 of the exiting flow channels 50 can be located in the tip portion 30; here, the exiting flow channels 50 traverse through internal portions of the nozzle body 20 and the tip portion 30. The ports 54 can communicate with the outer surface 32 of the tip portion 30, to provide egresses for the resin. In some embodiments, when the nozzle tip is viewed from above, the exiting flow channels 50 can occupy a plane that is perpendicular to a longitudinal axis of the central flow channel 24.

The exiting flow channels 50 can define resin flow pathways that are linear, straight, or unbent, or define arcing or curving pathways, or pathways with a bend or angle in them. The exiting flow channels 50 can connect with or intersect grooves 91 present on the exterior or outer surface 32 of the tip portion 30, so that each set made of a connected exiting flow channel 50 and its corresponding groove 91 define a resin flow pathway having an angle, preferably a sharp angle or right angle, in it.

The exiting flow channels 50 can define pathways that extend radially from a longitudinal axis of the nozzle body 20 or nozzle tip 10, or those pathways can extend in directions tangential to the central flow channel 24, preferably directing the exiting resin toward a circumference of the nozzle tip 10 or tip portion 30.

The exiting flow channels 50 can be angled, to cause the exiting resin to flow in swirling, turbulent vortex that can clean old or new resins from the structures of the nozzle tip 10 and from the structure of any housing 100 that contains such a nozzle tip 10.

The inlets 52 of the exiting flow channels 50 can be positioned at the terminal end 25 of the central flow channel 24 so that the inlets 52 are spaced apart from each other. The exiting flow channels 50 can be positioned within the tip or neck portions (e.g. 30) so that their ports 54 are spaced apart in the outer surface 32 of the tip or neck portions (e.g. 30). The inlets 52 can define a plane relative to a central longitudinal axis of the central flow channel 24. The ports 54 can define a plane relative to a central longitudinal axis of the central flow channel 24. The plane defined by the inlets 52 can be parallel to the plane defined by the ports 54, or can share the same plane. It is preferred that one or both of these planes be perpendicular, or at a nearly perpendicular angle, to the central longitudinal axis of the central flow channel 24; such nearly perpendicular angle can be between 30-150 degrees, 45-135 degrees, 60-120 degrees, or 80-100 degrees.

At the terminal end 25 of the central flow channel 24, the inlets 52 can regularly spaced apart, even equidistant, from the central longitudinal axis of the central flow channel 24 or each other. On the outer surface 32 of the tip portion 30, the ports 54 can be spaced apart, preferably, the ports 54 are regularly spaced apart, even equidistant, from the central longitudinal axis of the central flow channel 24 or each other.

The diameter or circumference of the central flow channel 24 can be greater than the diameters or circumferences of the inlets 52 and the ports 54. In some embodiments, the circumferences or diameters of the inlets 52 can be equal to the circumference or diameters of the ports 54. Alternatively, the circumferences or diameters of the inlets 52 can be larger or smaller than the circumferences or diameters of the ports 54. In preferred embodiments, the inlets 52 and the ports 54 have the same size and/or shape. In preferred embodiments, the inlets 52 and the ports 54 lack sharp edges, protrusions, or pockets that could expose outflowing resin to frictional forces or frictional heat.

It is preferred that the nozzle tip 10 possess a central longitudinal axis that is also the central longitudinal axis as the nozzle body 20, central flow channel 24, tip portion 30, and/or neck portion.

Some such nozzle tips 10 can be configured to create or generate a resin outflow for scouring or cleaning out residual resin from the nozzle tip and/or a housing 100 containing the nozzle tip 10, as the resin contacts those structures while the nozzle tip 10 is dispensing the resin. Other such nozzle tips 10 can be configured to create or generate turbulence in the outflowing resin, such as is generated when a liquid stream strikes a convex surface, so as to create a forceful washing effect on the nozzle tip 10 and/or structures that house or contain it.

Embodiment 1: Improved Nozzle Tip

As shown in FIGS. 1-7, embodiments of this nozzle tip 10 can include a nozzle body 20 joined or attached to a tip portion 30. The nozzle body 20 can include a nozzle base portion 26 for connecting to a resin-dispensing apparatus, and the nozzle base portion 26 can attach to the tip portion 30 at the end opposite the nozzle base portion 26.

The tip portion 30 can include a tip base 36, for joining the nozzle base portion 26, and a tip end 34 on the side or end opposite of the tip base 36, the tip portion 30 tapering to a sharp point or blunt end at the tip end 34.

Figure 2:
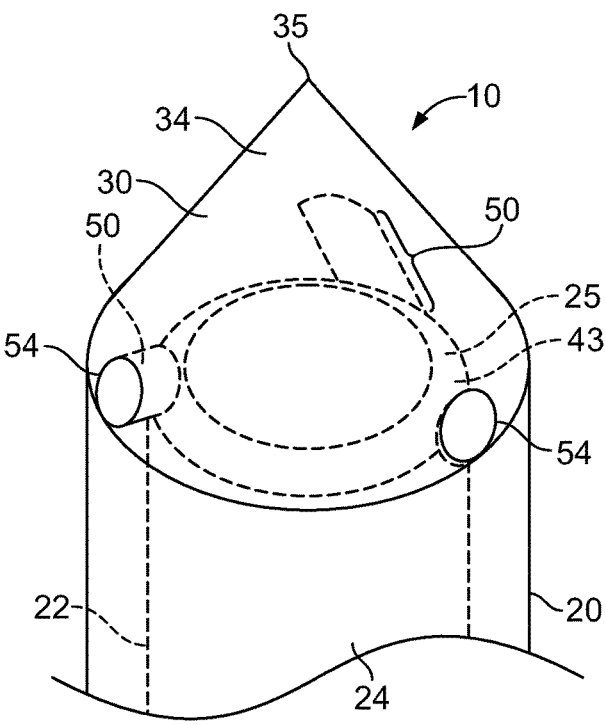
FIG. 2 shows a close-up of a portion of FIG. 1.
Figure 3:
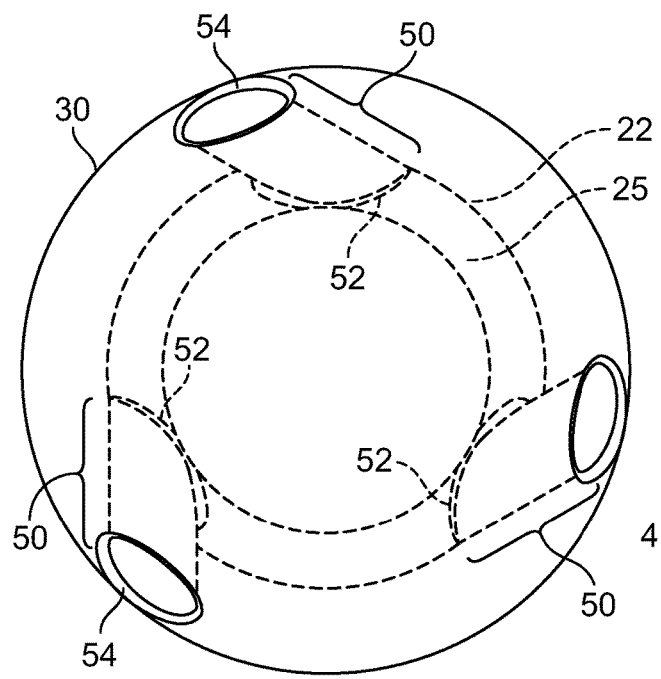
FIG. 3 shows an overhead view of FIG. 1.

In some embodiments, the nozzle tip 10 can be arranged around a central longitudinal axis and include structures with round, circular, or oval edges or boundaries, such as a cylindrical nozzle body 20 and a conical tip portion 30 (i.e., FIGS. 1-3). The nozzle base portion 26 can have a circumference or diameter equal to the circumference or diameter of the tip base 36. In some embodiments, the nozzle tip, the nozzle base portion 26 and tip portion 30 can have bilateral or equilateral symmetry around a plane intersecting a central longitudinal axis of the nozzle tip 10; in other embodiments, the nozzle tip 10 (i.e., FIGS. 5A-5B), the nozzle base portion 26 and tip portion 30 can have radial symmetry around the central longitudinal axis of the nozzle tip 10.

It is preferred that the outer surfaces of the nozzle tip 10 (i.e., nozzle base portion 26 and tip portion 30) be smooth and free from protrusions and indentations.

Figure 4:
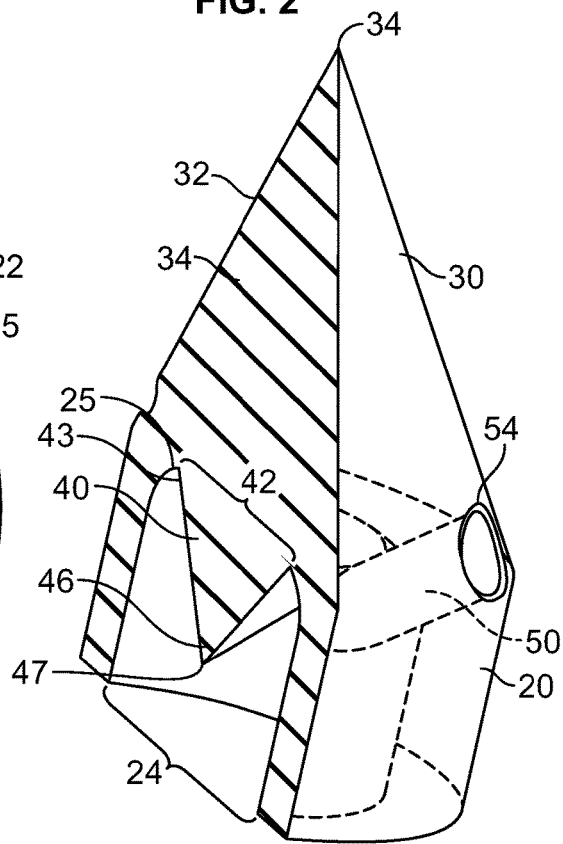
FIG. 4 shows a perspective view of a cross-section of an embodiment of the nozzle tip.
Figure 7:
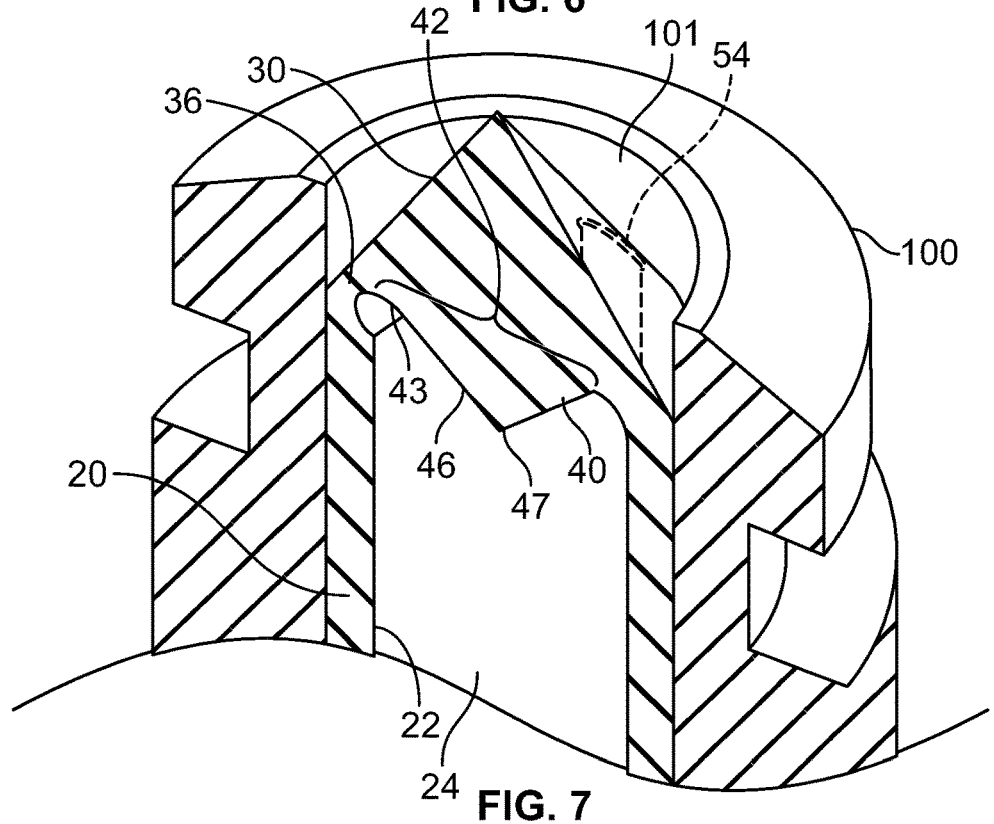
FIG. 7 shows a perspective view of a cross-section of FIG. 6.

The nozzle body 20 can define an interior central flow channel 24 positioned along a central longitudinal axis of the nozzle tip 10, with one end of the central flow channel 24 for connecting to a resin-dispensing apparatus and the other terminal end 25 branching into one or more exiting flow channels 50. The central flow channel 24 can run the length of the nozzle body 20 and provide a passageway within the nozzle body 20 through which resin travels from the resin-dispensing apparatus, through the nozzle body 20, and toward to the tip portion 30. When in use, resin is delivered from the apparatus to the terminal end 25 of the central flow channel 24. The terminal end 25 can include or communicate with the base 36 of the tip portion 30.

Where the tip portion includes a branching portion 40 that is ringed or flanked or surrounded by a peripheral portion 43, the peripheral portion 43 can define the outer border or edge of the branching portion 40 and mark the junction between the tip base 36 and the branching portion 40 (i.e., FIGS. 4 and 7). The branching portion 40 is a structure that can guide the flow of resin from the central flow channel 24 to the exiting flow channels 50 positioned at locations adjoining the peripheral portion 43. Each exiting flow channel 50 can include an inlet 52 for transporting resin from the central flow channel 24 to the exiting flow channel 50, and can include a port 54 for dispensing resin from the exiting flow channel 50 to the exterior of the nozzle tip 10. It is preferred that the inlets 52 contact the peripheral portion 43 of the branching portion 40, rather than the inlets 52 being positioned to contact only the central flow channel 24.

As shown in FIG. 3, where there is a plurality of exiting flow channels 50, it is preferred that the exiting flow channels 50 be regularly spaced apart or arranged equidistant from each other in the nozzle tip 10. The exiting flow channels 50 can be positioned at regular intervals so that their inlets 52 are regularly spaced apart around the peripheral portion 43 and their ports 54 are regularly spaced apart in the outer surface 32 of the tip portion 30. The exiting flow channels 50 can be positioned at the peripheral portion 43 to define the same offset angle with respect to the peripheral portion 43. It is preferred that the inlets 52 and ports 54 define holes or openings that are round, oval, or teardrop-shaped.

When viewed from above, as in FIG. 3, the path defined by each exiting flow channel 50 can describe a non-radial path between a longitudinal axis of the nozzle body 20 (or the central flow channel 24) and the tip base 36; that is, the path defined by each exiting flow channel 50 does not intersect a central longitudinal axis of the nozzle tip 10, nozzle body 20, and/or central flow channel 24. The exiting flow channels 50 can define paths that are neither parallel nor perpendicular to a central longitudinal axis of nozzle body 20, central flow channel 24, and/or tip portion 30. When viewed from above, the exiting flow channels 50 do not intersect with the central longitudinal axis of the central flow channel 24; if extended indefinitely, the pathways defined by the exiting flow channels 50 do not intersect with or contact the central longitudinal axis of the central flow channel 24.

When viewed from above, as in FIG. 3, if the exiting flow channels 50 were extended infinitely, they would not intersect to define a center point of a circle; instead, the exiting flow channels 50 would define secants around a common circle defined by the periphery 22 of the central flow channel 24. Where there are three exiting flow channels 50, their extended paths would define a triangle, preferably an equilateral triangle. Where there are four exiting flow channels 50, their extended paths would define a rectangle, preferably a square. Similarly, for any number of exiting flow channels 50 greater than two, their extended paths would define a polygonal shape having the same number of sides as the number of exiting flow channels 50; preferably, the paths would define regular polygonal figures having sides of equal lengths.

Figure 5A:
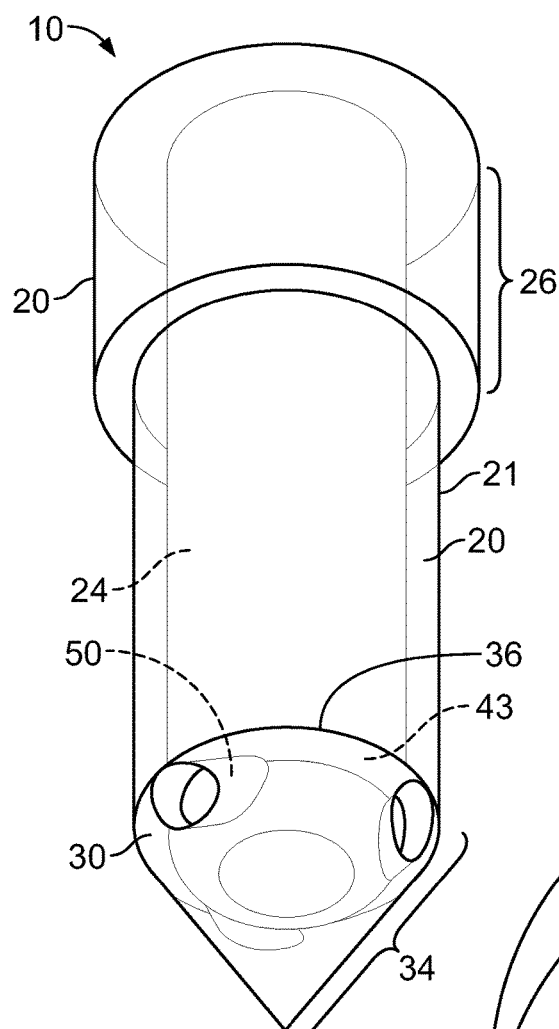
FIGS. 5A-5B show an embodiment of a nozzle tip, including a perspective view from the side (FIG. 5A) and a perspective view from facing the tip portion of the nozzle tip (FIG. 5B)
Figure 5B:
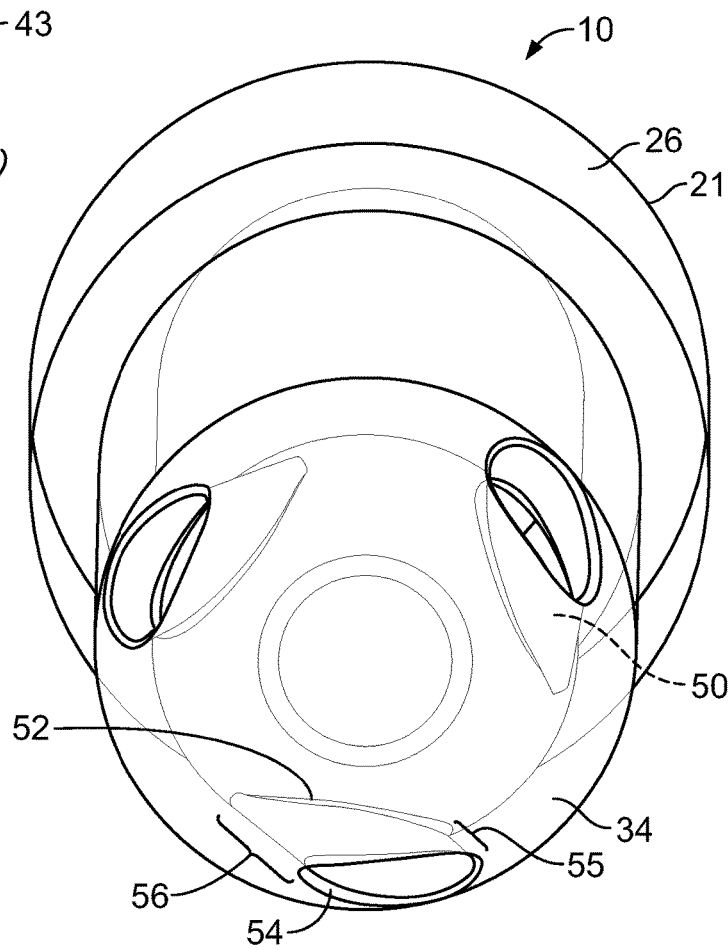

When viewed from above, as in FIG. 5B, each exiting flow channel 50 has first and second sides 55, 56. It is preferred that the sides have different lengths, and that each exiting flow channel 50 have a first side 55 that is shorter than the second side 56.

It is preferred that the exiting flow channels 50 be arranged in a regular-spaced fashion around a central longitudinal axis of the central flow channel 24, preferably to so that the exiting flow channels 50 display radial symmetry around a longitudinal axis of the central flow channel 24. For example, for each neighboring pair of exiting flow channels 50, they can be arranged so that the longer side of one exiting flow channel 50 is closest to the shorter side of the other exiting flow channel 50; thus, no short side of an exiting flow channel 50 will be closest to the short side of the other exiting flow channel 50 (and no long side of an exiting flow channel 50 will be closest to the long side of the other exiting flow channel 50).

As shown in FIGS. 1-4, particularly in FIG. 3, on a plane perpendicular to the central longitudinal axis of the central flow channel 24 (also called the horizontal nozzle plane), the plane defined by the ports 54, the exiting flow channels 50 can be directed outward in any direction that forms a non-radial angle with respect to the central flow channel 24. In comparison, the exiting flow channels 50 can be directed in either a radial angle in the vertical plane, as shown in FIG. 4, or non-radial angle in the horizontal plane as shown in FIG. 3, or both. In some embodiments, the exiting flow channels 50 are configured having an upward non-radial angle relative to the longitudinal axis of the central flow channel 24 and an outward non-radial angle relative to a plane perpendicular to the longitudinal axis of the central flow channel 24, such as shown in FIG. 1. In some embodiments, the ports 54 can define a plane other than truly perpendicular to the central longitudinal axis of the central flow channel 24, such as an angle can be between 30-150 degrees, 45-135 degrees, 60-120 degrees, or 80-100 degrees. In some embodiments, the exiting flow channels 50 can be positioned so as to direct outgoing resin toward a circumference of the nozzle tip 10, tip portion 30, or tip base 36.

Where the nozzle tip 10 is contained within a housing 100 (i.e., FIGS. 5C-5D, 6), the exiting flow channels 50 can be positioned to direct the flow stream of the exiting resin in direction tangential to the inner or interior surface 101 of the housing 100, to introduce centrifugal movement to the exiting resin, which can scour or clean that surface 101 free of old or residual resins.

In some embodiments the exiting flow channels 50 can be angled to direct the resin toward the circumference of the nozzle tip 10, angled away from the nozzle base portion 26 and/or toward the tip end 34, or angled in both directions simultaneously.

As shown in FIGS. 1-4, the inlets 52 can be spaced apart at regular intervals or arranged equidistant from each other along the terminal end 25 of the central flow channel 24, preferably along the peripheral portion 43 of the branching portion 40. The inlets 52 can regularly be spaced apart, even equidistant, from the central longitudinal axis of the central flow channel 24. The inlets 52 can define a plane that is perpendicular to the central flow channel 24 or the nozzle body 20. The ports 54 can be regularly spaced or arranged equidistant from each other along the outer surface 32 of the tip portion 30; in other embodiments, the ports 54 can contact the outer surface of the nozzle body 20. On the outer surface 32 of the tip portion 30, the ports 54 can be spaced apart, preferably, the ports 54 are regularly spaced apart, even equidistant, from the central longitudinal axis of the central flow channel 24 or each other. As shown in FIG. 3, the ports 54 can define a plane that is perpendicular to the central flow channel 24 or the nozzle body 20. In preferred embodiments, the plane defined by the inlets 52 and the lane defined by the ports 54 are parallel to each other. Where there are multiple ports 54, each port can be located at the same first distance from the tip base, the same second distance from the tip end 34, and the same third distance from each other 50. Like the ports 54, the inlets 52 can define a plane other than truly perpendicular to the central longitudinal axis of the central flow channel 24, such as an angle can be between 30-150 degrees, 45-135 degrees, 60-120 degrees, or 80-100 degrees.

The central flow channel 24 and the exiting flow channels 50 can describe passageways that are tubular or cylindrical. Likewise, the inlets 52 and the ports 54 can have cylindrical or ovate shapes or borders. It is preferred that the inlets 52 and the ports 54 describe convex shapes; they can be smooth and lack protrusions and indentations. The junctures where each inlet 52 joins the central flow channel 24 can be smooth or beveled or chamfered edges that provide flow paths free of obstructive areas. That is, these junctures can lack creases or folds. Likewise, the junctures where each port 54 joins the outer surface 32 of the tip portion 30 can be smooth or beveled or chamfered edges that provide flow paths free of obstructive areas.

To ensure resin flow paths free of obstructive areas, the central flow channel 24 and the exiting flow channels 50 can be configured to have smooth or arcing paths, lacking angles or sharp bends, particularly where the central flow channel 24 meets the exiting flow channels 50 as shown in FIGS. 3-4. This can also be accomplished with exiting flow channels 50 having non-intersecting flow paths that deliver resins independently of each other; the lack of intersections between the exiting flow channels 50 could eliminate the possibility of dead spots at such locations. Alternatively, the exiting flow channels 50 can define straight or linear pathways that lack curves or angles, or pathways having angles or bends in them. In other embodiments, the exiting flow channels 50 can be angled, causing the resin to exit the nozzle tip 10 in a turbulent flow whose tornado-like or swirling flow paths can scour or wash clean the structures of the nozzle tip 10.

Potential dead spots can also be avoided or minimized with central flow channels 24 that are free of internal obstructions or protrusions where they meet the exiting flow channels 50, as such obstructions could form resin-trapping creases or pockets on their interior surfaces where they join these delivery channels.

The exiting flow channels 50 can be configured so that the inlets 52, the locations where the central flow channel 24 meets the exiting flow channels 50, lack a fold or crease or other resin-entrapping space exposed to the resin as it moves from the former location to the latter location, as shown in FIGS. 3-4. The juncture where the central flow channel 24 meets the exiting flow channels 50 can be smooth or have a convex shape, as long as the juncture is configured without structures that define the resin-trapping spaces that occur in some conventional nozzle tips.

In preferred embodiments, the inlets 52 are configured without obstructions or protrusions to impede the flow of the resin into the exiting flow channels 50 (see FIGS. 2A-2B).

The tip portion 30 can include (or have joined to it) a branching portion 40 that extends inward into the central flow channel 24. The branching portion 40 can be located in the interior of the nozzle tip 10, positioned so that the branching protrusion 46 is located within the interior of the central flow channel 24, pointing away from the tip base and the tip end 34.

As shown in FIGS. 4 and 7, the branching portion 40 can taper or narrow to the branching point or branch protrusion 46; it is for guiding the flow of resin from the central flow channel 24 toward the inlets 52 of the exiting flow channels 50 positioned at locations adjoining the peripheral portion 43. The branch protrusion 46 can include a point or blunt end or apex 47 that points away from the tip end 34; the branch protrusion can point in the direction opposite the flow of the resin. In preferred embodiments, the end or tip of the branch protrusion 46 touches the central longitudinal axis of the central flow channel 24, nozzle body 20, and/or tip portion 30.

As shown in FIGS. 4 and 7, the tip portion 30 can include a tip base 36 that communicates with the nozzle body 20 and a tip end 34 on the side opposite of the tip base 36. The tip portion 30 can be generally conical, frustoconical, or pyramidal in shape; it can include a tip base 36 that tapers or narrows to a tip end 34, and the tip end can have a sharp or blunt point. It is preferred that the outer surface 32 of the tip portion 30 be smooth and free of protrusions and indentations.

As shown in FIGS. 5A-5D, resin can flow through an apparatus for delivery through the nozzle tip 10. Resin can be introduced into the nozzle tip 10 via the central flow channel 24 in the interior of the nozzle body 20. The central flow channel 24 can be positioned along a central longitudinal axis of the nozzle tip 10, with one end of the central flow channel 24 for connecting to a resin-dispensing apparatus and the other terminal end 25 dividing or branching into a plurality of exiting flow channels 50. Each exiting flow channel 50 can include an inlet 52 for transporting resin from the central flow channel 24 to the exiting flow channel 50, and can include a port 54 for transporting resin from the exiting flow channel 50 to the exterior of the nozzle body 20. The extruded resin can flow over the outer surface 32 of the tip portion 32 to the tip end 34, which delivers the resin to its destination.

Embodiment 2: Improved Nozzle Tip with Grooved Surface on Tip Portion

Figure 8:
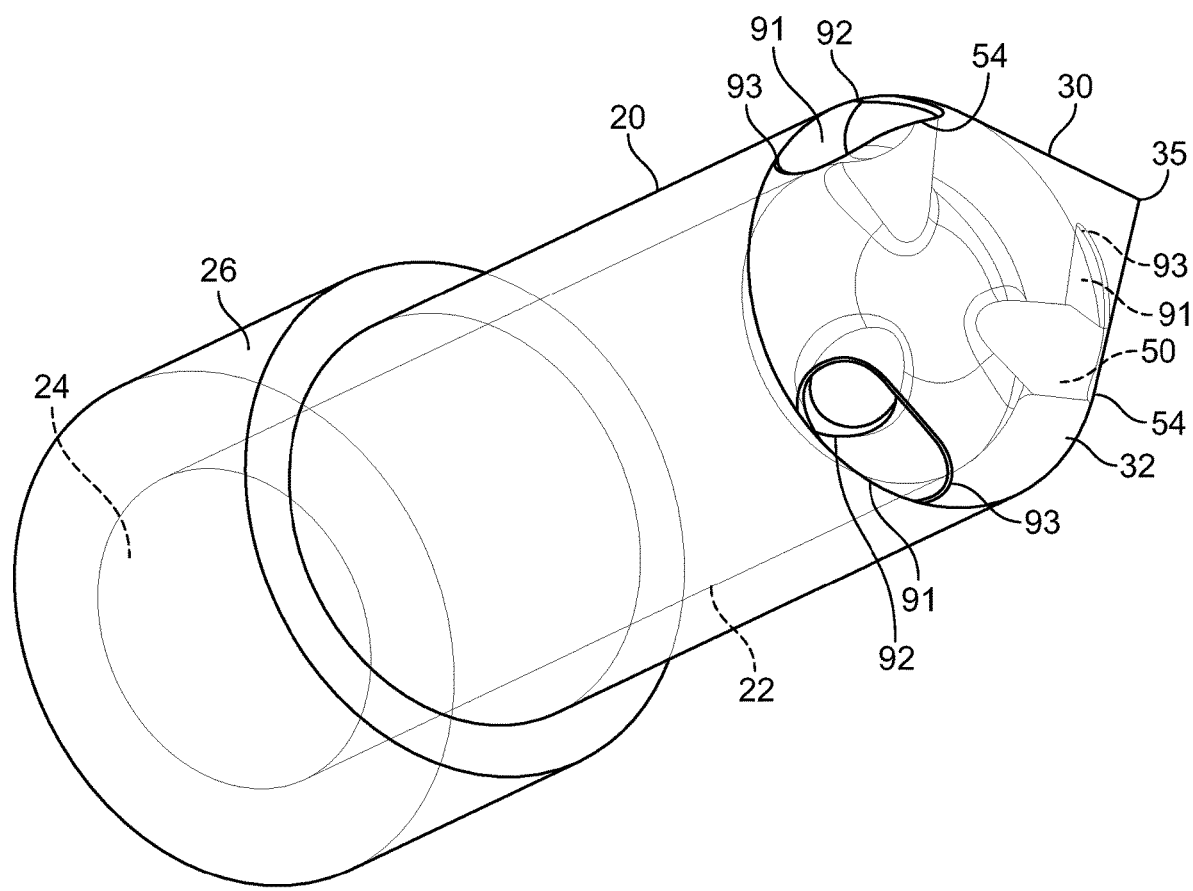
FIG. 8 shows a perspective view of an alternative embodiment of a nozzle tip having grooves in the tip portion.
Figure 9:
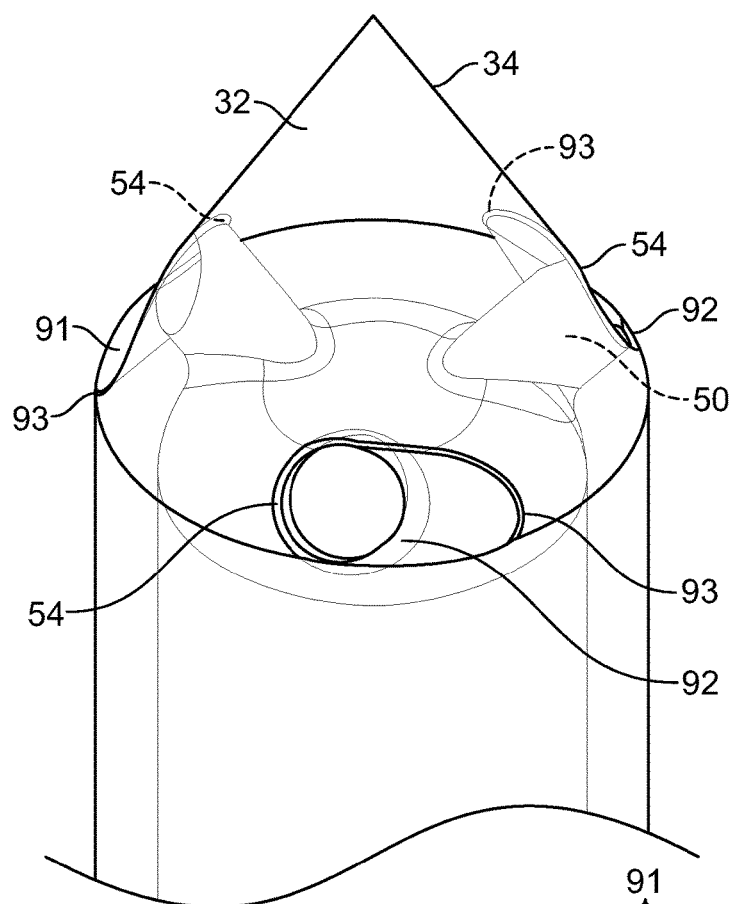
FIG. 9 shows a perspective top view of an alternative embodiment of FIG. 8.
Figure 10:
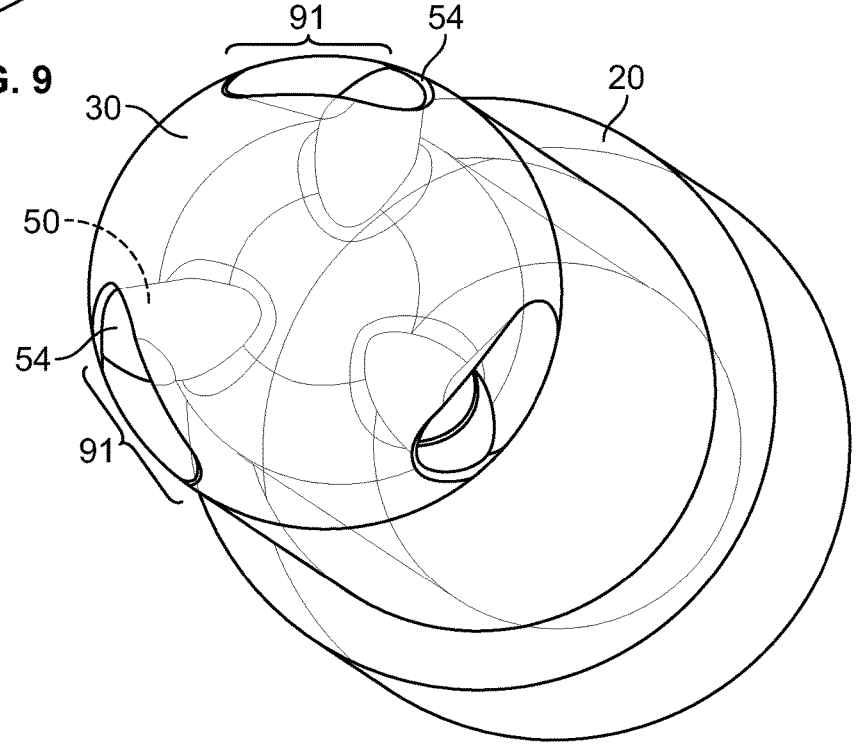
FIG. 10 shows a perspective top view of an alternative embodiment of FIG. 8.

As shown particularly in FIGS. 8-10, some embodiments of the improved nozzle tip 10 described above can create particular resin flow paths with certain configurations of exiting flow channels 50 and tip portions 30.

In such embodiments, the tip portions 30 can include a plurality of grooves 91 located on the exterior or outer surface 32 of the tip end 34. Each groove 91 can define a depression of indentation in the outer surface 32 of the tip end 34 of the tip portion 30. Each groove 91 can be curved or define a straight line. Each groove 91 can be positioned so that its length is perpendicular to the junction of the tip end 34 and the nozzle body 20. Each groove 91 can be positioned so that its length is perpendicular to a central longitudinal axis of the nozzle body 20 and/or nozzle tip 10. Alternatively, a groove can define a curved, arcing, or angled pathway.

It is preferred that the grooves 91 define a common plane on which all of the grooves 91 exist; it is more preferred, that this common plane be perpendicular to the central longitudinal axis of the nozzle body 20 and/or nozzle tip 10.

Each groove 91 can possess the same width throughout its entire length. The width of each groove 91 can decrease along its length, so that the groove 91 tapers on one end or adopts a teardrop or oval shape.

It is preferred that the grooves 91 be located at regularly spaced distances from each other (i.e., equidistant from each other). Where the grooves 91 have a perceivable orientation, it is preferred that all of the grooves 91 be arranged in a head-to-tail fashion, or that all of the grooves point or be oriented in the same direction.

Each groove 91 can have a first end 92 and a second end 93. The first end 92 of each groove 91 can be oriented so as to join or connect with the port 54 of a corresponding exiting flow channel 50. It is preferred that the second end 93 of each groove 91 be oriented so as to not join or connect with any port 54 or any other groove 91.

In some embodiments, every exiting flow channel 50 joins a corresponding groove 91; in other embodiments, grooves 91 can be found without a corresponding exiting flow channel 50, and vice-versa.

Where a groove 91 meets a corresponding exiting flow channel 50, the exiting flow channel 50 can define a curved pathway, but an exiting flow channel 50 defining a straight, unbent, or linear pathway is preferred. It is preferred that the exiting flow channel 50 be oriented to be located on a plane perpendicular to a central longitudinal axis of the nozzle tip 10 and/or central flow channel 24. The inlets 52 of the exiting flow channels can be located so as to contact the junction of the tip base 36 and/or branching portion 40, as well as the central flow channel 24. The ports 54 of the exiting flow channels 50 can contact the exterior or outer surface 32 of the tip end 34 (or tip portion 30). An edge of the port 54 can contact the nozzle body; alternatively, the entire port 54 can be located in the tip portion 30.

Each port 54 can join or connect with a groove 91. The exiting flow channel 50 and the groove 91 can define a resin flow pathway that contains a sharp angle or curve in it. The edges of each groove 91 can define a plane that intersects its corresponding exiting flow channel 50 at a perpendicular angle. It is believed that when resin is forced through these sharply angled, nonlinear pathways, that the resin generates or experiences turbulence that causes the resin to move in a swirling path that causes the resin to scour the surfaces near it (i.e., a housing holding the nozzle tip).

Although this embodiment has been described in terms of structures and pathways oriented at perpendicular or right angles, other embodiments can adopt structures and pathways having sharp angles less than 90 degrees, such as between 45-135 degrees, 60-120 degrees, 80-100 degrees, or 85-95 degrees.

Embodiment 3: Improved Nozzle Tips in Housing

As shown in FIGS. 5C-5D and 6-7, some embodiments of the nozzle can be shaped to fit within a housing 100. Such housing 100 can be in communication with an apparatus containing a resin or other flowable material to be dispensed (not shown). For example, an injection nozzle can be combined with an injection molding machine to deliver a molten material into a mold cavity. Similarly, an inkjet printer can use a nozzle to dispense ink, or a syringe can use a nozzle to dispense a variety of liquids.

Figure 5C:
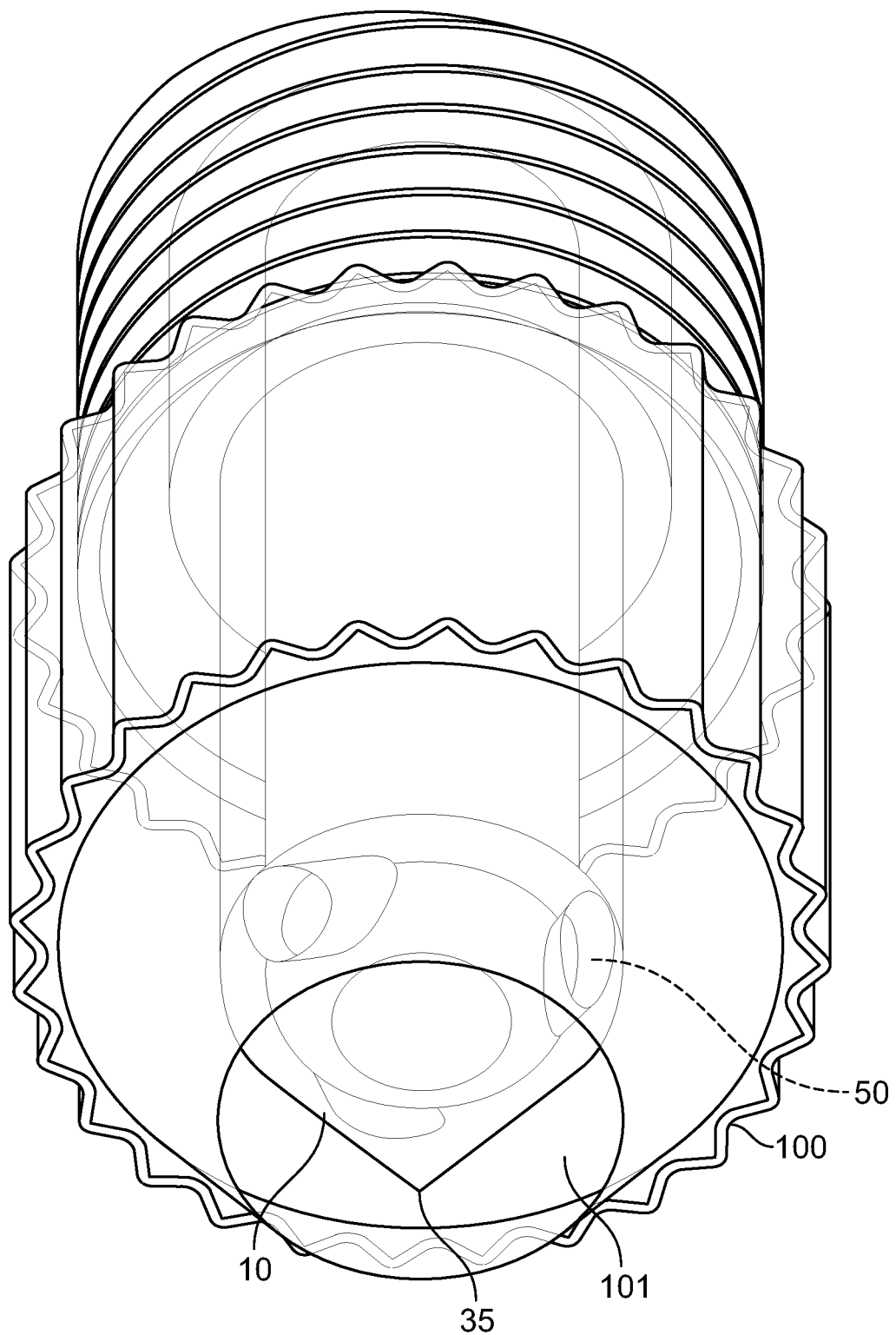
FIGS. 5C-5D show the nozzle tip of FIGS. 5A-5B positioned within a housing, including a side perspective view (FIG. 5C) and a perspective view from facing the tip portion of the nozzle tip (FIG. 5D)
Figure 5D:
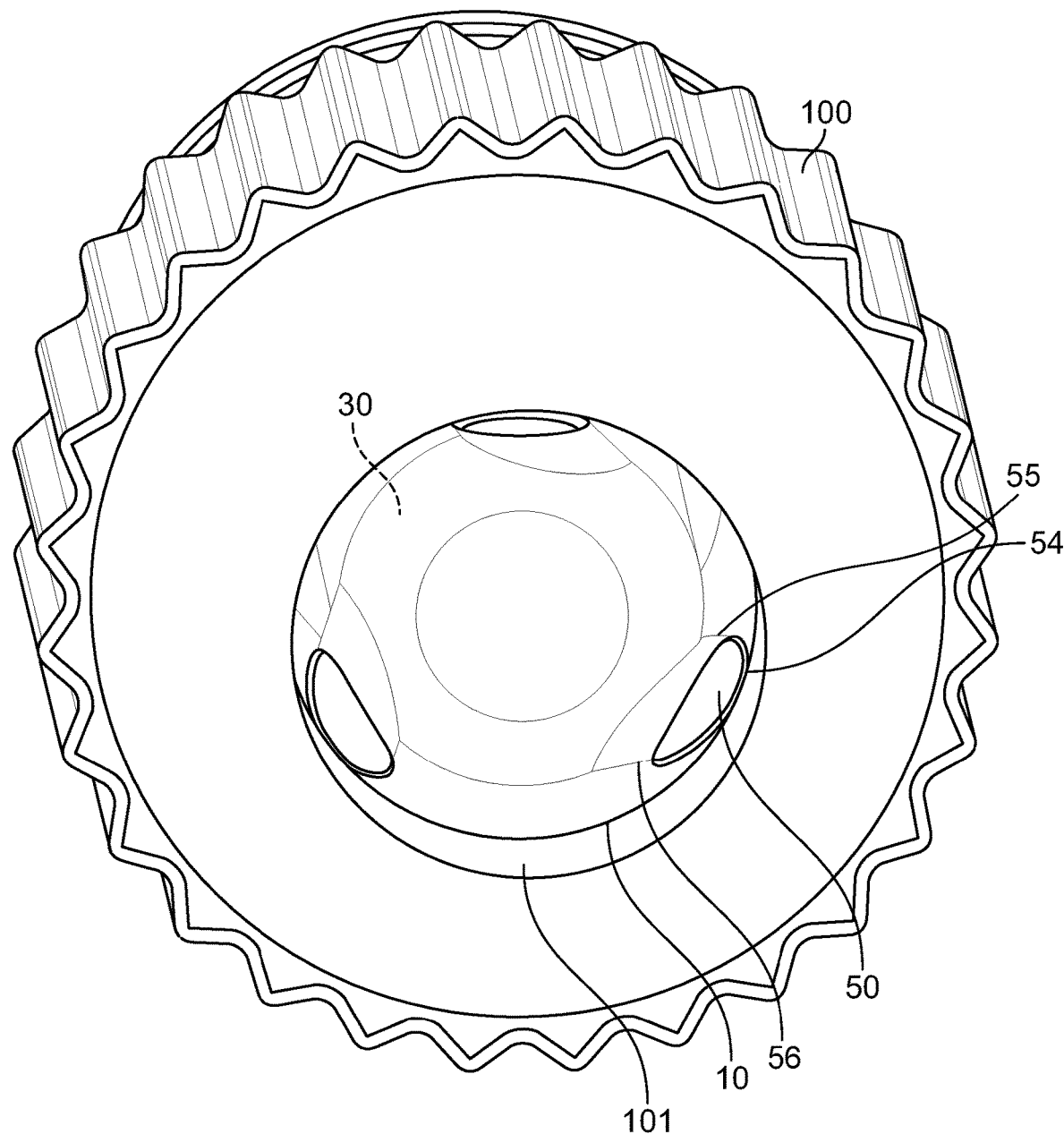
Figure 6:
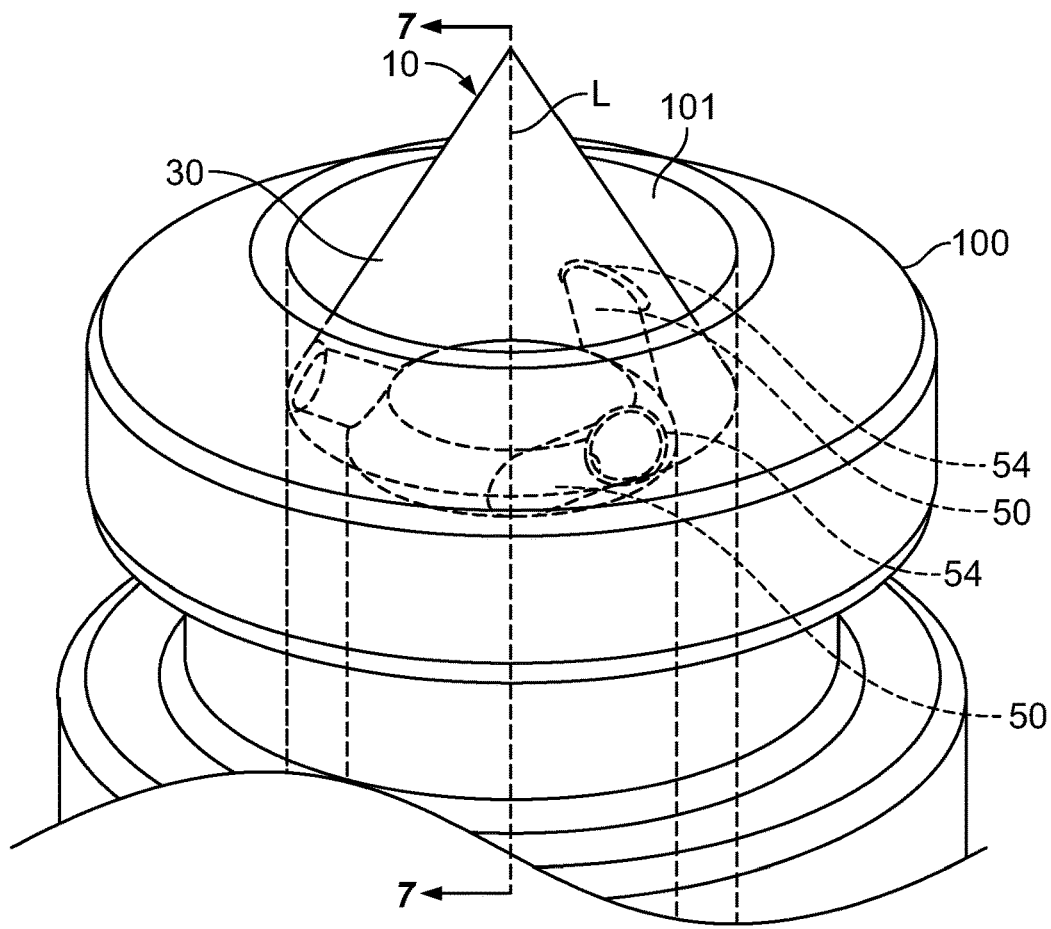
FIG. 6 shows a perspective view of an alternative embodiment of a nozzle tip within a housing.

In some embodiments, resin or other flowable material can be directed toward the housing 100, so that an interior surface 101 of the housing 100 can guide the destination of the resin and/or widen the flow path of the resin (FIGS. 5C-5D, 6). It is envisioned that the nozzle can work in conjunction with an improved nozzle tip 10 to minimize the accumulation of resins at locations where the nozzle tip 10 communicates with its housing 100.

In other embodiments, the nozzle can be disposed in a housing 100 so that the nozzle tip 10 directs the flow of the resin in a direction away from its associated housing 100. For example, if the nozzle tip 10 and housing 100 shown in FIGS. 5C-5D were oriented with its tip portion 30 to lie parallel with the central flow channel 24, the nozzle tip 10 can employ gravity to direct the flow of its resin away from the housing 100, thus preventing an accumulation of resin on its housing 100.

Additional Embodiments

In some embodiments, the nozzle body 20 can be cylindrical in shape; in other embodiments, the nozzle body 20 can be another regular polygonal shape, such as a rectangle, or an irregular shape. Alternatively, the nozzle body 20 can incorporate a plurality of different shapes. In some embodiments, the nozzle body 20 can be smooth; in others, the outer surface 21 can have a plurality of concave and/or convex surfaces. In some embodiments, the nozzle body 20 can be shaped to fit within a housing 100 or terminate in a nozzle base portion 26 for connecting with an apparatus containing a resin or other flowable material to be dispensed.

Embodiments include nozzles that incorporate the improved nozzle tip 10, either with or without an associated housing 100. Other embodiments include apparatuses that incorporate the improved nozzle tip 10, such as injection mold machines for molding plastic materials, inkjet printers, paint dispensers, and tattoo guns.

The nozzle tips 10 described herein are not limited to embodiments having fixed or continuous tip portions 30. In some embodiments, the tip portions 30 can disengage from the nozzle tip 10 (i.e., for cleaning, repair, or replacement). For example, such a removable tip portion 30 could be engaged with a reciprocal pin, such as a valve-gated tip portion, or other engaging mechanism known to in the art.

It is envisioned that the embodiments described herein can be used to dispense a wide variety of liquids or flowable materials, such as hot resins, powders, paints, inks, medicines, foods, beverages, cleaning materials, household chemicals, and sealants. The embodiments described herein have many potential uses in different apparatuses, such as printers dispensing ink, injection machines molding plastic parts, and syringes dispensing medicine, and other applications including delivering fertilizers, applying paints or inks, dispensing foods, applying chemicals or household cleaners, and more.

It is expected that viscosity of the material dispensed by the invention will particularly affect the preferred configuration of the nozzle tip and the nozzle in order to achieve optimum delivery of material. It is also expected that the physical properties of the dispensed materials will determine which embodiments are best suited to dispense particular materials.

For convenience, embodiments of the invention typically refer to dispensing resins for injection molding. However, it is understood that these embodiments described herein can be used for other liquids and flowable materials and for the applications, such as are described above.

Branching Portions

Some embodiments of the invention include a feature for minimizing or preventing the accumulation of resin at the location where the central flow channel 24 branches into the exiting flow channels 50. Specifically, the branching portion 40 of the central flow channel 24 can be configured to lack a pocket, depression, or other structure capable of capturing or entrapping the resin as the resins travels from the central flow channel 24 to the exiting flow channels 50. In particular, the branching portion 40 can contain a convex structure that directs the flow of the resin into the multiple flow streams.

As shown in FIGS. 4 and 7, the exiting flow channels 50 can extend outward from the central flow channel 24 at the common branching portion 40, defining passageways between the central flow channel 24 and the exterior surfaces (i.e., 21, 32) of the nozzle tip 10. In some conventional nozzles, such branching portion can be flat or concave, providing a place for resin to accumulate. In the present invention, the branching portion 40 can instead possess a raised or convex surface that protrudes away from the tip end 34 of the tip portion 30 and/or toward the base portion 26 of the nozzle body 20. The branching portion 40 can comprise a branch base portion 42 communicating with the tip portion 30 and a convex body portion 40 facing or extending away from the tip portion 30. As flowing resin encounters this raised, convex branching portion 40, the resin is forced to move past the branching portion 40 and into the inlet 52 of an exiting flow channel 50 (or other kind of delivery channel) to be dispensed out of the nozzle tip 10. The branching portion 40 provides a structure for guiding the flowing resin from the central flow channel 24 into the separated exiting flow channels 50, instead of having a space or pocket or crease where a portion of the resin can pool and separate itself from the rest of the flowing resin.

In preferred embodiments, the branching portion 40 can be conical, frustoconical, trapezoidal, domelike, or pyramidal in shape, although any convex shape can be used, and can have a pointed end or protrusion 46 in opposition to the branch base portion 42 that communicates with the tip portion 30. That protrusion 46 can be sharply pointed, bluntly pointed, or conical in shape; it can also be smooth and free of projections and/or indentations, or can be round or dome-shaped. It is preferred that the central longitudinal axis of the branching portion 40 lies on the same central longitudinal axis as the central flow channel It is preferred that the branch base portion 42 have a circumference or diameter that is smaller than the circumference or diameter of the central flow channel 24. In a cross-section of the branching portion 40, through its branch base portion 42 and the apex of the branching point or protrusion 46, the branch protrusion 46 can define a sharp point whose cross-section has an acute or narrow angle. Alternatively, a cross-section of the branch protrusion 46 can define a comparatively broader, blunter branching portion 40 with an apex 47 defining an obtuse angle. Some embodiments can have a branching portion 40 that defines a right angle (90 degrees) or an obtuse angle (more than 90 degrees) at the apex 47 or define a smooth, curved surface lacking a defined point. It is expected that the viscosity of the resin will determine which configuration is preferred for particular embodiments.

Non-Radially Arranged Flow Paths

Centrifugal force is the tendency of an object following a curved path to move outward and away from the center of the curve. The exiting flow channels 50 can be spaced apart and configured, relative to the central flow channel 24 that they communicate with, in generally straight or curved paths which can introduce a centrifugal force on the resin when the resin travels through the exiting flow channels 50. Centrifugal force can be introduced by the inertia of the movement of the resin as it travels along in a generally curved or semicircular path as it is diverted from the direction it flows in the central flow channel 24 to the different direction it flows in the exiting flow channels 50. The configuration of these flow paths can result in an application of centrifugal force on the resin, driving the resin to move away from the terminal end 25 of the central flow channel 24, through the inlets 52 and outward toward the ports 54, thus decreasing the amount of resin that remains behind and accumulates at the branching portion 40 of the exiting flow channels 50.

As shown in FIGS. 1-3, if the nozzle tip 10 is oriented so that the nozzle body 20 is at the bottom and the tip end 34 is the top, the exiting flow channels 50 can be configured to extend outward in a vertical direction, a horizontal direction, or both. That is, the exiting flow channels 50 can extend in a sloped or angled or arcing manner, from the central flow channel 24 and through an inlet 52 and a port 54, successively, to the outer surface 32 of the tip portion 30, so that each port 54 is closer to the tip end 34 than its corresponding inlet 52. In other embodiments, the exiting flow channels 50 can extend outward in paths perpendicular to a central longitudinal axis along the central flow channel 24.

Each exiting flow channel 50 can have an inlet 52 at the location where the exiting flow channel 50 meets the central flow channel 24. It is preferred that the exiting flow channels 50 define flow paths that are separate from each other; that is, they do not intersect or meet each other.

The exiting flow channels 50 can be disposed non-radially on a plane perpendicular to the longitudinal axis of the central flow channel 24. When viewed from above, if the exiting flow channels 50 were extended infinitely, they would not intersect to define a center point of a circle; instead, the exiting flow channels 50 would define secants around a common circle. When viewed from above, the exiting flow channels 50 cannot intersect with the central longitudinal axis of the central flow channel 24; if extended indefinitely, the pathways defined by the exiting flow channels 50 do not intersect with or contact the central longitudinal axis of the central flow channel 24.

In preferred embodiments, the exiting flow channels 50 can define secants disposed around the circumference of the central flow channel 24, and those secants do not overlap or intersect. In some embodiments, the exiting flow channels 50 define divergent, non-intersecting flow paths in the interior of the nozzle tip to the outer surface 32 of the nozzle tip 10. In other embodiments, the exiting flow channels 50 define divergent, non-intersecting flow paths in the interior of the nozzle tip to the outer surface 21 of the nozzle body 20 or to the neck portion 60.

As shown in FIG. 4, the exiting flow channels 50 can be directed in an angle extending from the base portion 26 to the outer surface 21 of the nozzle body 20. The exiting flow channels 50 can angle outward from the branching portion 40 of the central flow channel 24 toward the toward the outer surface 21 of the nozzle body 20. The exiting flow channels 50 can angle upward direction relative to the horizontal plane defined by the inlets 52 and the horizontal plane defined by the ports 54. It is preferred that the exiting flow channels 50 are configured in a horizontal direction with an angle between 10-45 degrees with respect to that horizontal plane and a horizontal direction with an angle between 10-30 degrees is more preferred (also called the vertical nozzle plane).

Specific embodiments of an improved nozzle tip according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A nozzle tip for dispensing resin for flow within a mold comprising: a nozzle body including a single interior channel central flow having a longitudinal axis, periphery and a terminal end portion, the terminal end portion comprising a branching portion having an apex with an obtuse point tapering away from the flow of the resin, the branching portion having a base with a volume less than central flow channel, the central flow channel being in communication with a plurality of spaced-apart exiting flow channels at the base, each exiting flow channel having an inlet and a port, each exiting flow channel extending away from the central flow channel on a horizontal plane perpendicular to the longitudinal axis, each inlet communicating with the central flow channel at a location immediately adjacent the terminal end portion in the nozzle body in a manner free of obstruction and each port being free of obstruction and directly contacting an outer surface of the nozzle body and the mold cavity wherein each exiting flow channel defines an arcing path starting at the terminal end portion of the central flow channel and ending at the outer surface of the nozzle body, each path defining a secant that does not intersect with the longitudinal axis of the central flow channel and extends outward from the periphery of the central flow channel, configured to eliminate dead zones within the interior flow channel and maintaining an area within the interior flow channel free of the dead zones.

2. The nozzle tip of claim 1, wherein: the inlets are spaced apart around a terminal end of the central flow channel, and the ports are spaced apart on the outer surface of the nozzle body, the ports being located at equal distances along the nozzle body.

3. The nozzle tip of claim 2, wherein each port contacts the nozzle body.

4. The nozzle tip of claim 1, wherein a terminal end of the central flow channel decreases in circumference to communicate with a base of the exiting flow channel, the central flow channel having an arcing surface at the terminal end.

5. The nozzle tip of claim 1, wherein each port is located closer to the nozzle body than to an apex of the tip end.

6. The nozzle tip of claim 1, wherein: the inlets of the exiting flow channels are uniformly spaced apart around the nozzle body; the ports of the exiting flow channels are uniformly spaced apart on the outer surface of the tip end; and a line defined by each exiting flow channel does not intersect the longitudinal axis of an exiting flow channel.

7. The nozzle tip of claim 1, wherein the exiting flow channels extend away from a longitudinal axis of the central flow channel, and the exiting flow channels extend away from the nozzle body.

* * * * *